April 1, 1930.   G. E. JEANDHEUR   1,752,990
WEATHER STRIPPING
Filed Jan. 4, 1929
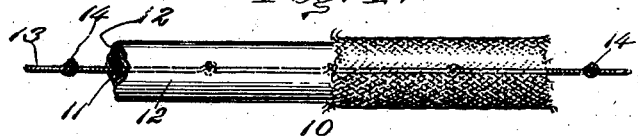
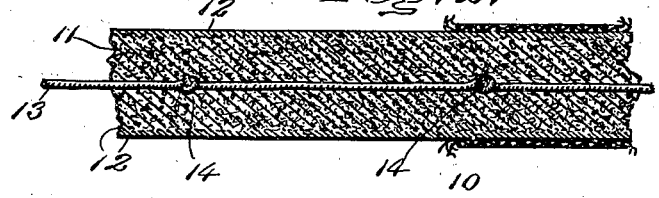
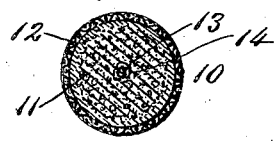
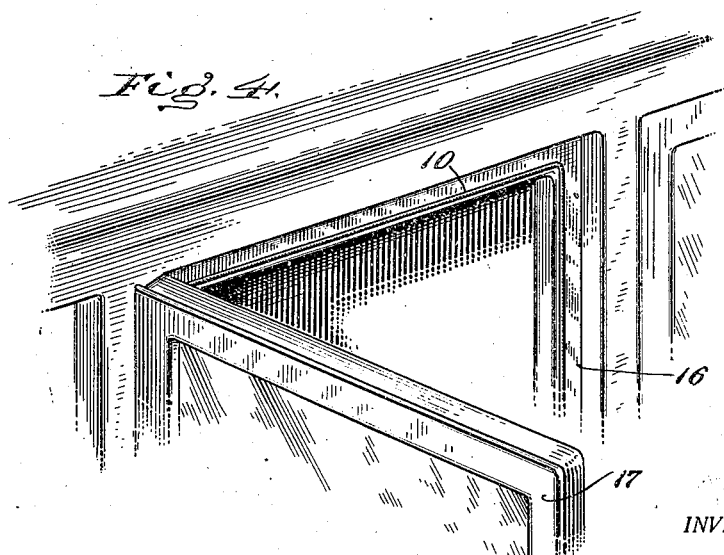
INVENTOR.
BY George E. Jeandheur
his ATTORNEY.

Patented Apr. 1, 1930

1,752,990

UNITED STATES PATENT OFFICE

GEORGE E. JEANDHEUR, OF GREAT NECK, NEW YORK

WEATHER STRIPPING

Application filed January 4, 1929. Serial No. 330,203.

My invention relates to improvements in wind or weather stripping and the same has for its object, more particularly, to provide a simple, efficient and inexpensive construction which may be readily applied to doors and windows of automobiles or other structures subject to jarring or shaking.

Further, said invention has for its object to provide an elastic or resilient weather stripping whose length will not be increased or stretched, either temporarily or permanently, while the same is being fed through or being acted upon by a machine in the operation by forming or securing a covering thereon.

Further, said invention has for its object to provide a construction which is uniformly elastic or compressible in all directions transversely of its length, and longitudinally sub20 stantially inelastic.

Further, said invention has for its object to provide a construction having reinforcing means extending longitudinally therethrough which, while rendering the structure inelas25 tic or yielding longitudinally of its length, will not interfere with or impair its elasticity in any direction transversely of its length.

Further, said invention has for its object to provide a structure composed of a body or core of more or less porous elastic material having a substantially imperforated outer wall, and a core of inelastic material imbedded or molded within said body or core and serving to render said core substantially in35 elastic longitudinally of its length without interfering with or impairing the elasticity of said body or core in any direction transversely of its length.

Further, said invention has for its object to provide a structure comprising an elastic core or body formed of spongy rubber or analogous material and reinforced with a central strand of inelastic material such as cord which is molded into said core or body and serves to render the said elastic body or core non-extensible longitudinally of its length in order to permit of said core or body being acted upon by a suitable machine for weaving or otherwise forming or securing a covering of textile or other material thereon.

A great disadvantage encountered in the manufacture of elastic or resilient weather stripping has been the difficulty in enclosing, and more particularly in braiding, an enclosing covering upon an elongated elastic body, such as sponge rubber owing to the fact that when such material is fed through, or acted upon by a suitable machine, the same must be fed or held under more or less tension while the covering is being produced thereon or applied thereto. This naturally results in an undue temporary stretching of the elastic body, with the result that when the same is removed from the machine it will instantly contract to, and resume its normal shape. As the difference in length will become greater as the length of the body portion increases, it will be obvious that the body portion will be very materially shorter than the covering produced or secured thereon while the same was in its abnormal or stretched condition. This disadvantage results in a waste of covering material, as well as time and labor. By my invention, however, I am enabled to utilize a very elastic or resilient substance, such as sponge rubber, and by embedding within the same a central member of substantially nonelastic material I am enabled, without impairing the elasticity of the strip in any direction transversely of its length, to render the stripping inelastic longitudinally so as to permit of its being fed through or acted upon by a machine for applying a covering thereto.

Other objects will in part be obvious and in part be pointed out hereinafter.

To the attainment of the aforesaid objects and ends my invention consists in the novel features of construction, and in the combination, connection, and arrangement of parts hereinafter more fully described and then pointed out in the claims.

In the accompanying drawings—

Figure 1 is an enlarged side elevation showing a short section of one form of wind or weather stripping constructed according to, and embodying my said invention;

Fig. 2 is a central longitudinal section on the line 2—2 of Fig. 3;

Fig. 3 is a transverse section on the line 3—3 of Fig. 2, and

Fig. 4 is a detail perspective view showing a portion of an automobile body, with my invention applied to the door thereof.

In said drawings 10 designates a short section of wind or weather stripping comprising a core or body portion 11 which is here shown of cylindrical form, and composed of sponge rubber or analogous material having an imperforate wall portion 12. Centrally within the core body portion 11, is a substantially non-elastic member 13 in the form of a piece of cord or the like which is molded into the core or body portion 11 during the making thereof, and is substantially integral therewith. The said inelastic member 13 is of relatively small diameter so that the same shall not interfere with or impair to any appreciable or material degree the elasticity or resiliency of the core or body portion 11, transversely in any direction. The member 13 should, however, be of such size and of such material that the same will not be longitudinally elastic or yielding to any material degree. In order to anchor said member 13 more securely within the core or body portion 11, the same may be provided at suitable intervals with knots or other convenient enlargements 14, which will aid in preventing the said cord or member 13 being withdrawn endwise from the core or body portion 11.

The core or body portion 11 is preferably enclosed in a casing such, for example, as a woven covering 15 of braided or other suitable material.

In use the wind or weather stripping 10 is disposed upon the face or side of a door frame 16, see Fig. 4, and may be secured thereto at intervals by nails or other convenient means, so that when the door 17 is closed the inner face of its frame will bear against the outer surface of said stripping 10 and compress the same transversely between the inner side of the door 17 and the outer side of the contiguous frame portion 16.

It is to be noted that since my construction of stripping is equally compressible transversely in any direction, the same may be readily applied to a door or window structure, and serve to effect a wind and weather-proof joint.

Further, it is to be noted that while I have shown the body portion of the stripping as of cylindrical outline in cross-section, that the same may be also made of elliptical or polygonal outline.

Having thus described my said invention, what I claim and desire to secure by Letters Patent is:

1. A weather stripping comprising an elongated elastic body portion, means disposed longitudinally within the same serving to neutralize longitudinally the elastic qualities of said body portion, and means carried by and on said first-named means for preventing longitudinal movement of said first-named means relative to said body portion, substantially as specified.

2. A weather stripping comprising an elongated, cylindrical elastic body portion, a member disposed longitudinally within the same serving to neutralize longitudinally the elastic qualities of said body-portion, and means constituting a part of said member for anchoring the same against longitudinal movement within said body portion, substantially as specified.

3. A weather stripping comprising an elongated substantially solid elastic body portion, and means embedded longitudinally within the same serving to render said body portion inelastic in a direction parallel to its length, substantially as specified.

4. A weather stripping comprising an elongated, porous elastic body portion, and means incorporated therewith and disposed centrally, longitudinally within said body portion and serving to render the same inelastic longitudinally of its length, without impairing its elasticity transversely of its length, substantially as specified.

5. A weather stripping comprising an elongated body portion of sponge rubber, and inelastic means disposed centrally, longitudinally within the same and incorporated therewith, and serving to render said body portion inelastic longitudinally of its length, substantially as specified.

6. A weather stripping comprising an elongated body portion of sponge rubber, inelastic means disposed centrally, longitudinally within the same and incorporated therewith, and serving to render said body portion inelastic longitudinally of its length, and means constituting a part of said inelastic means for preventing longitudinal movement of said inelastic means relative to said body portion, substantially as specified.

7. A weather stripping comprising an elongated cylindrical, body portion of relatively small diameter, formed of sponge rubber, and an inelastic cord disposed centrally, longitudinally within the same and incorporated therewith serving to render said cylindrical body portion inelastic longitudinally of its length without impairing its elasticity in any direction transversely of its length, substantially as specified.

8. A weather stripping comprising an elongated cylindrical, body portion of relatively small diameter, formed of sponge rubber, an inelastic cord disposed centrally, longitudinally within the same and incorporated therewith serving to render said cylindrical body portion inelastic longitudinally of its length without impairing its elasticity in any direction transversely of its length, and a flexible covering enclosing said body portion, substantially as specified.

9. A weather stripping comprising an elongated body portion of uniform cross-sectional area formed of sponge rubber, and an inelastic cord molded centrally, longitudinally within the same and integral therewith and serving to render said body portion inelastic longitudinally of its length; said inelastic cord being of such relatively small diameter not to impair the elasticity of said body portion in any direction transversely of its length, substantially as specified.

10. A weather stripping comprising an elongated body portion of uniform cross-sectional area formed of sponge rubber, an inelastic cord molded centrally, longitudinally within the same and integral therewith, and serving to render said body portion inelastic longitudinally of its length; said inelastic cord being of such relatively small diameter not to impair the elasticity of said body portion in any direction transversely of its length, and a textile covering enclosing said body portion, substantially as specified.

11. A weather stripping comprising an elongated body portion of uniform cross-sectional area formed of porous rubber, an inelastic cord molded centrally, longitudinally within the same, and means on said cord for anchoring the same within said body portion; said cord serving to render said body portion inelastic longitudinally of its length, substantially as specified.

12. A weather stripping comprising an elongated body portion of uniform cross-sectional area formed of porous rubber, an inelastic cord molded centrally, longitudinally within the same, and enlargements at intervals on said cord for anchoring the same within said body portion; said cord serving to render said body portion inelastic longitudinally of its length, substantially as specified.

13. A weather stripping comprising an elongated body portion of uniform cross-sectional area formed of porous rubber, an inelastic cord molded centrally, longitudinally within the same, and knots formed at intervals on said cord for anchoring the same within said body portion; said cord serving to render said body portion inelastic longitudinally of its length, substantially as specified.

14. A weather stripping comprising an elongated body of uniform cross-sectional area formed of a core of flexible cord surrounded by sponge rubber encased in a surface layer of impervious rubber, substantially as specified.

15. A weather stripping comprising an elongated body portion composed of a central core provided at intervals with protuberances, a porous rubber body enclosing said core, and an impervious rubber layer enveloping said porous rubber body, the whole being vulcanized together into an integral structure, substantially as specified.

Signed at the city of New York, in the county and State of New York, this 5th day of December, one thousand nine hundred and twenty-eight.

GEORGE E. JEANDHEUR.